United States Patent Office 2,951,811
Patented Sept. 6, 1960

2,951,811
GERMICIDALLY ACTIVE SOAP CONTAINING SILVER ION EXCHANGE RESIN

Garson A. Lutz, Columbus, and Robert E. Sharpe, Worthington, Ohio, assignors, by mesne assignments, to Permachem Corporation, West Palm Beach, Fla., a corporation of Florida No Drawing. Filed Feb. 20, 1956, Ser. No. 566,385

2 Claims. (Cl. 252—107)

This invention relates to germicidally active soaps and more particularly to soaps containing a cation exchange material in its silver form.

Germicidal agents for use in soaps must possess a combination of properties which very few substances possess. In the first place, the germicide must be one which kills microorganisms on contact of very short duration. Another requirement for germicides for use in soaps is that they must not be harmful to human skin. Furthermore, the soap must not interfere with the action of the germicidal agent. A number of substances which are effective germicides in other applications are ineffective as germicides in soap. Very few substances have been found heretofore to have any noticeable effectiveness as germicides in soap, and none have been found to possess a high degree of effectiveness.

Various silver compounds have long been known to be effective bactericides in various applications. Silver compounds in general have been most effective in applications where the salt remained in contact with the material to be sterilized for a substantial period of time. Because a compound to be effective as a germicide in soap must kill organisms on very brief contact time, it is not surprising that silver compounds have been generally regarded as not being good germicides in soap.

According to this invention it has been found that soaps containing a cation exchange material having silver as the exchangeable cation are effective in killing skin bacteria under ordinary washing conditions. Ion exchange resins in the silver form are particularly desirable as germicidal agents in soap according to this invention. Various cation exchange resins having silver as the exchangeable cation have been found to impart germicidal activity when incorporated in soap. Among these are the silver forms of sulfonic acid ion exchange resins, such as the sulfonated styrene resins, which may be either sulfonation products of linear styrene polymers or cross-linked copolymers of sulfonated styrene and divinylbenzene. Carboxylic acid resins in silver form have also been found to be germicidal. Other cation exchange resins in silver form also have similar germicidal action when incorporated in soap. The phrase, "cation exchange resin in silver form," herein denotes a cation exchange resin in which silver is the predominant cation.

The ion exchange resins according to the present invention kill a large number of different types of bacteria, even when incorporated in relatively small amounts in soap. These resins, when incorporated in soaps at a concentration of about 500 parts per million of silver, are very rapid in their action against bacteria. The silver concentration in the soaps may be considerably lower than this, for example, as low as 100 parts per million of silver or even lower. Higher concentrations than 500 parts per million of silver may be incorporated in soap. In general these higher concentrations are unnecessary, as the germicides are highly effective in concentrations of 500 parts per million in soap.

Conventional ion exchange methods and materials may be used to prepare the ion exchange materials in silver form. The starting materials may be commercially available cation exchange resins such as "Dowex 50," a sulfonated styrene polymer which may be either linear or cross linked to varying degrees with divinylbenzene, manufactured by The Dow Chemical Company, "Amberlite IRC–50," a carboxylic acid type resin made by The Rohm and Haas Company, or other resins or materials. Conventional ion exchange methods may be used to convert the starting ion exchange material to the silver form. It is desirable, in treating ion exchange resins in the hydrogen form, first to treat the resin with an alkali metal base or basic reacting salt, such as sodium hydroxide or sodium carbonate. The ion exchange resin or material in alkali metal form may then be treated with a silver nitrate solution to form the silver form of the material. The silver form of the ion exchange material is dried and incorporated in soap.

The complex silver compounds which are used in soap germicides of the present invention may be incorporated in any of the conventional fatty acid soaps. These soaps may be in the form of bar soap for hand or bath use, soap powders, shaving cream, or liquid soap.

The major constituent of soaps according to the present invention is a conventional fatty acid soap, that is, an alkali metal soap of one or more of the fatty acids such as stearic acid, palmitic acid, or oleic acid. A mild soap having a pH of about 7 to 10 is particularly desirable as the soap base. Soaps containing a silver ion exchange resin according to this invention have substantially the same mildness as the soap base.

The silver ion exchange material may be incorporated in soap by conventional methods, during crutching or milling for example. Soap may be mixed with the silver compound to be incorporated and a limited amount of water, and the resulting mix agitated to form a paste. The soap in paste form may be then formed into a large piece or slab and cut into bars. Where a soap in paste form, such as a shaving cream, is desired, it is necessary only to mix the ingredients in the desired proportions.

Soaps prepared according to the present invention have been found to kill skin bacteria rapidly in the course of ordinary washing, as found in hand washing tests following the procedure described by Pohle and Stuart in Journal of Infectious Diseases, volume 67, page 275 (1940). Soaps according to this invention were found to kill bacteria at a considerably more rapid rate in actual hand washing tests than a mild soap used as a control. The soaps according to the present invention differed from the control only in the presence of a germicidally active silver salt.

The invention will now be further described with reference to specific examples thereof.

EXAMPLE I

Ten grams of "Dowex 50," a cation exchange resin in hydrogen form, was stirred with 100 milliliters of 0.5 N sodium hydroxide to convert the resin to its sodium form. "Dowex 50," an aromatic polymer of the type described in U.S. Patent 2,366,007, is sold commercially by The Dow Chemical Company, Midland, Michigan, as a synthetic cation exchange resin from sulfonation of a copolymer of styrene and about 8 percent divinyl benzene. "Dowex 50" has a cross-linked aromatic hydrocarbon chain containing nuclear sulfonic acid groups as the sole cation active groups. The resin was washed with water until the washings were neutral. Then the resin was stirred with 100 milliliters of 5 percent aqueous silver nitrate, filtered, and washed with water until the wash water was silver-free. The resin in silver form was dried at 50° to 60° C. for about 16 hours.

EXAMPLE II

Five grams of "Amberlite IRC-50," a carboxylic acid type ion exchange resin in hydrogen form, were placed in 100 milliliters of 2 N sodium hydroxide and allowed to stand for about 48 hours. "Amberlite IRC-50" is sold commercially by Rohm & Haas Corporation, Philadelphia, Pennsylvania, as a synthetic cation exchange resin from copolymerization of methacrylic acid and a minor amount of divinyl benzene. "Amberlite IRC-50" is a synthetic cation exchange resin containing carboxyl groups as the sole cation active groups and is of the type prepared by copolymerization of methacrylic acid and a minor amount of a polyvinyl aryl compound. The resin was filtered and washed with water. The resin was then treated with 8.5 grams of silver nitrate dissolved in 100 milliliters of water. After about 2 to 3 hours the resin was filtered and washed with water until the wash water was silver-free. The silver form of the resin was then dried at 60° to 70° C.

EXAMPLE III

Each of the ion exchange resins in silver form, prepared as described in Examples I and II, was incorporated into a batch of soap as follows:

One hundred grams of a white granular soap and 200 milligrams of the resin finely ground were dry mixed in a Waring Blendor. The mixture was blended until it started to dust. Then an additional 100 grams of the white granular soap were added and blended thoroughly. Blending was continued for several minutes. This reduced the soap to very fine particle size and thoroughly blended the resin with the soap. The dry blend was then transferred to the bowl of a household mixer. Then 250 milliliters of water were added and the mixture was blended to a thick, smooth paste. The paste was transferred to a 10 x 14-inch glass plate and formed into a cake 6 x 10 inches with a stainless steel spatula. The large cake was scored with the spatula into 20 cakes, each 1½ x 2 inches and approximately ½ inch thick. After air drying for several hours, the cakes were separated and turned over. Drying was completed at room temperature.

A control soap was made in the same manner as the test soaps, except that silver ion exchange resins were omitted.

The bacteriotoxicity of each of the soaps was tested in handwashing tests. Each person moistened his hands and forearms up to a distance 14 inches above the tip of the middle finger on each hand for 25 seconds in a wash basin containing 2 liters of water. Then each person worked up a lather on the hands with a bar of soap prepared as described above in this example. This lathering took 25 seconds, and was followed by an additional 75 seconds of scrubbing of the entire test area. Each person then rinsed the lather from the test area in the wash basin for 20 seconds. Each person repeated this washing test for a total of 10 times before drying his hands. A separate basin was used for each washing.

Two persons used soap containing the silver form of "Dowex 50" (linear polymer) for the entire series of 10 washings. A second group of 5 persons washed their hands with bars of the control soap for the first three washings, and then used soap containing the silver form of "Amberlite IRC-50" for the remainder of the test. The third group, numbering 16 persons, used the control soap throughout the test.

Samples were taken from each wash basin to determine the bacterial count. The average bacterial count after each of the ten washings was obtained for both the test soap containing silver and the control soaps. The average microbe count after each of the ten washings, in number of microorganisms in 0.1 milliliter, and the percentage reduction in bacterial count in each washing compared to the preceding washing, are given in Table 1 below for the test soaps containing an ion exchange resin for the control soap.

Table 1

SOAP CONTAINING SILVER FORM OF "DOWEX 50"

| Number of Washings | Microbe Count (microbes in 0.1 ml.) | Percent Reduction from Previous Basin |
|---|---|---|
| 1 | 237.8 | |
| 2 | 130.0 | 45 |
| 3 | 89.5 | 31 |
| 4 | 58.5 | 35 |
| 5 | 35.3 | 40 |
| 6 | 27.3 | 23 |
| 7 | 38.5 | −41 |
| 8 | 35.8 | 7 |
| 9 | 28.8 | 20 |
| 10 | 29.8 | −3 |

SOAP CONTAINING SILVER FORM OF "AMBERLITE IRC-50"

| | | |
|---|---|---|
| 1[1] | 136.2 | |
| 2[1] | 131.7 | 3 |
| 3[1] | 89.1 | 32 |
| 4 | 19.8 | 78 |
| 5 | 18.1 | 9 |
| 6 | 10.1 | 44 |
| 7 | 5.6 | 45 |
| 8 | 9.8 | −75 |
| 9 | 8.9 | 9 |
| 10 | 32.8 | −270 |

CONTROL SOAP (NO ADDITIVE)

| | | |
|---|---|---|
| 1 | 333.3 | |
| 2 | 257.3 | 23 |
| 3 | 226.3 | 12 |
| 4 | 166.1 | 27 |
| 5 | 131.2 | 21 |
| 6 | 101.4 | 23 |
| 7 | 82.7 | 19 |
| 8 | 114.7 | −39 |
| 9 | 96.2 | 16 |
| 10 | 72.2 | 25 |

[1] Control soap used in first three washings.

All soaps containing ion exchange resins in silver form were effective in killing skin bacteria, as the results in Table 1 show. The soap containing the silver form of "Amberlite IRC-50," a carboxylic acid type resin, caused a marked reduction in microbe count, particularly in the first washing in which it was used. This washing, which was the fourth washing in the test, caused a drop of 78 percent in average microbe count.

While the present invention has been described with reference to specific embodiments thereof, it is understood that this description is by way of illustration and not limitation.

What is claimed is:

1. A germicidally active soap composition consisting essentially of a water-soluble, alkali metal higher fatty acid soap and a germicidal amount of a sulfonic acid cation exchange resin in silver form, said resin being characterized as a sulfonated copolymer product of styrene and a minor amount of divinyl benzene and as containing nuclear sulfonic acid groups as the sole cation-active group.

2. A germicidally active soap composition consisting essentially of a water-soluble, alkali metal higher fatty acid soap and a germicidal amount of a carboxylic acid cation exchange resin in silver form, said resin being characterized as a copolymerization product of methacrylic acid and a minor amount of divinyl benzene and as containing carboxyl groups as the sole cation-active group.

References Cited in the file of this patent

UNITED STATES PATENTS 1,993,686    Schulenburg _____ Mar. 5, 1935

(Other references on following page)

UNITED STATES PATENTS

| | | |
|---|---|---|
| 2,535,077 | Kunz et al. | Dec. 26, 1950 |
| 2,600,719 | Wood | June 17, 1952 |
| 2,684,321 | Thurmon et al. | July 20, 1954 |

FOREIGN PATENTS

| | | |
|---|---|---|
| 503,873 | Canada | June 22, 1954 |

OTHER REFERENCES

"Disinfection and Sterilization," pub. by Lea and Febiger, Phila. (1945), page 281.

Winters: "The Ion Exchange Process," pub. by Rohm & Haas Co. (1950).